United States Patent
Lucas et al.

(10) Patent No.: US 8,209,115 B2
(45) Date of Patent: Jun. 26, 2012

(54) METHOD AND DEVICE FOR AIDING THE GUIDANCE OF AN AIRCRAFT ALONG A FLIGHT TRAJECTORY

(75) Inventors: Fabrice Lucas, Toulouse (FR); Jean-Louis De Menorval, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 1281 days.

(21) Appl. No.: 11/877,467

(22) Filed: Oct. 23, 2007

(65) Prior Publication Data

US 2008/0103646 A1 May 1, 2008

(30) Foreign Application Priority Data

Oct. 26, 2006 (FR) .................................... 06 09408

(51) Int. Cl.
*G06F 19/00* (2011.01)
(52) U.S. Cl. ........................................................ 701/122
(58) Field of Classification Search .................. 701/120, 701/121, 122
See application file for complete search history.

(56) References Cited

U.S. PATENT DOCUMENTS

| | | | |
|---|---|---|---|
| 3,936,828 A * | 2/1976 | Muesse et al. ................ 342/394 |
| 4,086,632 A * | 4/1978 | Lions ............................. 701/210 |
| 5,332,180 A * | 7/1994 | Peterson et al. ................... 246/3 |
| 5,715,163 A * | 2/1998 | Bang et al. ..................... 701/202 |
| 6,061,612 A * | 5/2000 | Sainthuile et al. ................. 701/7 |
| 6,112,141 A * | 8/2000 | Briffe et al. ...................... 701/14 |
| 6,122,572 A * | 9/2000 | Yavnai ............................ 701/23 |
| 6,266,610 B1 * | 7/2001 | Schultz et al. ................. 701/528 |
| 6,405,124 B1 * | 6/2002 | Hutton .......................... 701/467 |
| 6,507,782 B1 * | 1/2003 | Rumbo et al. ................. 701/121 |
| 6,633,810 B1 * | 10/2003 | Qureshi et al. ................ 701/206 |
| 6,707,475 B1 * | 3/2004 | Snyder .......................... 715/771 |
| 7,623,960 B2 * | 11/2009 | Wise et al. .................... 701/204 |
| 7,668,647 B2 * | 2/2010 | Barber et al. ................. 701/206 |
| 7,756,632 B2 * | 7/2010 | Wise et al. .................... 701/204 |
| 2002/0183900 A1 | 12/2002 | Sainthuile |
| 2003/0093219 A1 * | 5/2003 | Schultz et al. ................ 701/202 |
| 2007/0078572 A1 | 4/2007 | Deker et al. |

FOREIGN PATENT DOCUMENTS

| FR | 2749933 | 12/1997 |
|---|---|---|
| FR | 2816091 | 5/2002 |
| FR | 2861871 | 5/2005 |

OTHER PUBLICATIONS

Preliminary Search Report dated Jun. 20, 2007.

* cited by examiner

*Primary Examiner* — Thomas G. Black
*Assistant Examiner* — Sze-Hon Kong
(74) *Attorney, Agent, or Firm* — Dickinson Wright PLLC

(57) ABSTRACT

Method and device for aiding the guidance of an aircraft along a flight trajectory. The device makes it possible to cause the aircraft to pass at least one particular waypoint of the flight trajectory, at an associated target time, and to do so to within an associated temporal tolerance.

18 Claims, 3 Drawing Sheets

Figure 1:
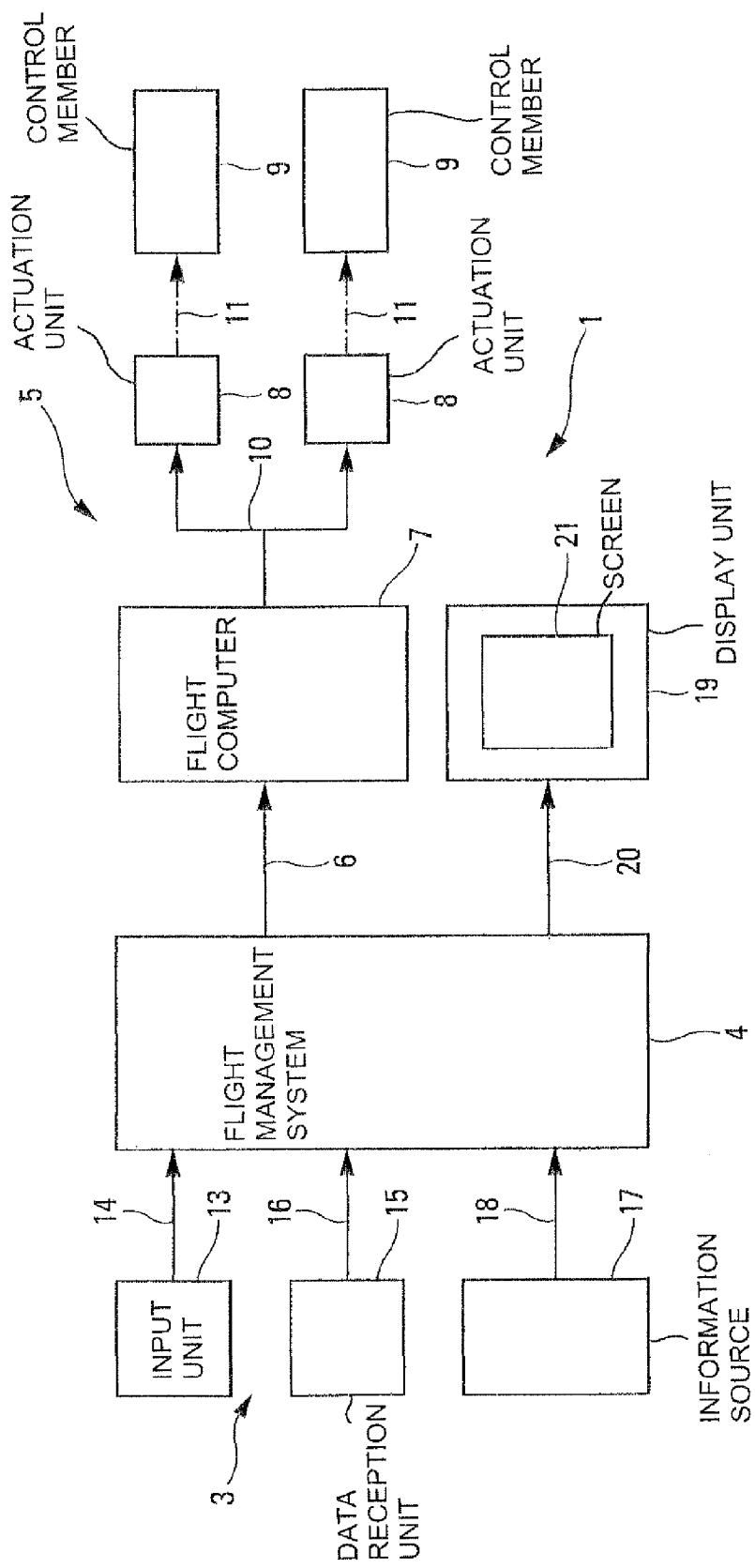

METHOD AND DEVICE FOR AIDING THE GUIDANCE OF AN AIRCRAFT ALONG A FLIGHT TRAJECTORY

FIELD OF THE INVENTION

The present invention relates to a method and a device for aiding the guidance of an aircraft, in particular a transport airplane, along a flight trajectory.

Although not exclusively, the present invention applies more particularly to the guidance of aircraft, such as, in particular civil, transport airplanes, during an airport landing phase. It is known that such a landing phase is generally monitored and managed by air traffic controllers. One of the tasks of an air traffic controller is to ensure compliance, by the various aircraft converging towards a particular point (of convergence) of space, with a sequence of arrival times at this particular point. This sequence of arrival times at this point may itself be provided, for example, by a standard system located on the ground, which automates the traffic planning. The air traffic controller must then give the crews of the various aircraft guidance instructions so as to preserve a satisfactory separation between two successive aircraft and to ensure that said aircraft comply with the sequence of arrival times at said convergence point with a certain precision.

In zones of heavy traffic density, this kind of standard management of sequencing presents an air traffic controller with a significant workload, which is made ever more complex on account of the continuous growth in air traffic.

Moreover, the time span between two successive instructions of the controller to one and the same crew may become relatively significant, of the order of a few tens of seconds, and sometimes even reach a minute.

Such guidance of the aircraft, effected via instructions transmitted from the ground, does not therefore offer sufficient precision and must be compensated for through separation minima imposed between two aircraft, that are sufficiently sizeable. Of course this has the drawback of increasing the density of the air space.

Furthermore, standard sequencing management like this makes it possible to issue authorizations in respect of trajectories which are optimized in terms of traffic flow management, but to the detriment in particular of parameters specific to each aircraft, that are liable to be very sensitive, for example for airlines, such as fuel consumption, engine wear, time of arrival at the airport or sound emissions. In particular, it is known that during very dense traffic, the air traffic controller often has a very low deconfliction horizon (of the order of a few minutes) and frequently uses a technique called "path stretching" to sequence the aircraft precisely. This standard technique consists in reducing or increasing the length of the trajectory of an aircraft, so as to adjust the times of passage of the various aircraft at a given point. Most of the time, such a procedure is performed by radar guidance (also known as "radar vectoring") by placing the aircraft at a low holding altitude. This late trajectory adjustment, associated with guidance that is not engendered by a flight management system of the aircraft, does not make it possible to issue an optimized trajectory in respect of said aircraft, and it often turns out to be expensive especially in terms of fuel consumption and environmental impact (sound emissions, etc.).

Additionally, document FR-2 749 933 discloses a method for managing air speed with a view to complying with the time constraints of an aerodyne in a changeable meteorological environment. This method comprises a first phase of determining a possible point of the trajectory onwards of which, theoretically, it becomes impossible to uphold the requested time constraint by following the previously established speed profile and a second phase of calculating a change of speed and determining a new speed profile obtained by determining speed corrections segment by segment commencing from said point and up to the last modifiable segment, the variation in speed in each of the segments being limited to a maximum value. This method makes it possible to guarantee compliance with the time constraints while remaining consistent with the aspirations of the pilot and air traffic controllers.

The present invention relates to a method of aiding the guidance of an aircraft along a flight trajectory, which makes it possible to remedy the aforesaid drawbacks.

For this purpose, according to the invention, said method which is intended at least to provide aircraft guidance aid information, is noteworthy in that:

a) first input parameters are generated, comprising:
  at least one start point corresponding to the start of a first segment on said flight trajectory;
  at least one end point corresponding to the end of this first segment on said flight trajectory;
  an arrival time corresponding to the required arrival time of the aircraft at said end point; and
  a first temporal error margin;

b) on the basis of said start point, of said end point, of said arrival time and of said first temporal error margin, automatically:
  at least said first segment which starts at said start point and finishes at said end point is determined;
  this first segment is integrated into said flight trajectory in such a way as to obtain a first modified trajectory;
  a first vertical speed profile is determined, indicating the vertical speed of said aircraft exclusively along said first segment, which allows the aircraft to arrive at said final point at said arrival time;
  a target time for at least one waypoint which is situated on said first segment, is deduced from said first vertical speed profile, said target time defining the time at which the aircraft must pass said waypoint;
  a temporal tolerance relating to the compliance with said target time at said waypoint is determined at least on the basis of said first temporal error margin; and
  at least first guidance aid information comprising said first modified trajectory, and, for each waypoint, the target time and the temporal tolerance that are associated with said waypoint are provided.

Preferably, said step b) is implemented for a plurality of different waypoints.

Moreover, according to the invention, in a subsequent step c), the aircraft is guided with the aid of said first guidance aid information, by carrying out a temporal slaving (by adapting its speed) to cause said aircraft to pass each waypoint in question at the associated target time, and to do so to within the associated temporal tolerance.

Thus, by virtue of the invention, it is possible to guarantee with a desired level of precision (first temporal error margin which is adjustable) and a certain probability level, an arrival time of the aircraft at any point in space, in particular at a standard point of convergence of aircraft during a landing on an airport.

Moreover, according to the invention, the speed fluctuation implemented on the aircraft in such a way as to allow it to attain the above objective is limited to said first segment. This fluctuation is therefore limited in space and in time. This would not for example be the case if the flight management system of the aircraft had simply been provided with a prescribed arrival time of RTA ("Required Time of Arrival")

type, since in this case the speed modification would have been implemented as soon as said RTA time was input and up to the arrival at the convergence point, and this might have given rise to potential conflicts between two consecutive aircraft and might have worried the air traffic controller.

The process in accordance with the present invention therefore enables an air traffic controller to ascertain and to impose with the level of precision suited to the zone under control (by providing a first appropriate temporal error margin) the time of passage of an aircraft at a predefined point of a (first) segment, whose limits (start point, end point) are adjustable. The time is controlled inside said (first) segment, and the impact of modified guidance in respect of the temporal slaving is restricted to a zone which may thus be known by the air traffic controller. This adjustable limitation, in space, of the part (first segment) of the flight trajectory where the guidance of the aircraft is temporally slaved, is very advantageous. Indeed, it makes it possible in particular to aid the air traffic controller to:

better anticipate the alterations in the traffic (by widening the deconfliction horizon); and sequence the aircraft more precisely, while limiting the risks of conflict between two consecutive aircraft.

Another advantage of the present invention is that an aircraft can thus be guided on a flight trajectory integrating time constraints, which are calculated by a flight management system and which are thus optimized (in standard fashion) in particular as regards fuel consumption, engine wear and environmental impact.

In a particular embodiment, in step a), means are provided, making it possible for an operator to manually input at least some of said first input parameters and/or means are provided, making it possible to automatically receive at least some of said first input parameters.

Within the framework of the present invention, a waypoint of said first segment can correspond to various points of this segment.

Advantageously, said waypoint can correspond to said end point. In this case, said associated target time corresponds to said arrival time, and said associated temporal tolerance corresponds to said temporal error margin. Furthermore, as a variant or adjunct, said waypoint can also correspond to a point of said first segment other than said end point. In this case:

said associated target time is an intermediate time at which the aircraft must pass said waypoint in such a way as to arrive at said arrival time at said end point; and said associated temporal tolerance is such that it makes it possible to comply with the arrival time at said end point to within said temporal error margin.

It will be noted moreover that the arrival time estimated by the flight management system at the end point of said first segment may be transmitted from onboard to the ground via a data transmission link.

Additionally, advantageously:

at least steps a) and b) are carried out for a plurality of first segments; and/or at least said start and end points are presented on a navigation screen.

Furthermore, in a preferred embodiment:

in step a), second input parameters are moreover generated, comprising:

a plurality of successive auxiliary points of said flight trajectory, the first of said successive auxiliary points in the direction of flight of the aircraft corresponding to said end point;

associated with at least some of said auxiliary points, times of passage corresponding to the times at which the aircraft must pass respectively these auxiliary points; and a second temporal error margin; and in step b), on the basis of said auxiliary points, of said times of passage and of said second temporal error margin, automatically:

at least one second segment is determined, which comprises said auxiliary points, which begins at the first of said successive auxiliary points, that is to say at said end point of said first segment; and which finishes at the last of said auxiliary points;

this second segment is integrated following said first segment into said first modified trajectory in such a way as to obtain a second modified trajectory, said first and second segments forming a global segment;

a target time at which the aircraft must pass said auxiliary point is determined for each auxiliary point with which no time of passage is associated, the target time of the other auxiliary points corresponding to the associated times of passage;

a second vertical speed profile is deduced, indicating the vertical speed of said aircraft exclusively along said second segment, which allows the aircraft to pass said auxiliary points at the associated target times;

an auxiliary temporal tolerance is determined at least on the basis of said second temporal error margin; and second guidance aid information comprising said second modified trajectory, said auxiliary temporal tolerance and, for each auxiliary point, the associated target time are provided.

Moreover, in this preferred embodiment, in step c), the aircraft is guided with the aid of said second guidance aid information, by carrying out a (temporal) slaving making it possible to cause the aircraft to pass each auxiliary point at the associated target time, and to do so to within said auxiliary temporal tolerance.

This preferred embodiment makes it possible to control, with a certain probability level and the desired level of forecasting (second temporal error margin which is adjustable), a four-dimensional position or 4D position (each auxiliary point's 3D geographical position associated with a target time relating to this auxiliary point) of the aircraft in a zone (second segment) whose limits in space are fixed. Moreover, by associating said first segment with this second segment it is possible to impose the limits of the transition zone (first segment) used to enter said second segment at the required time.

Said second segment therefore enables an air traffic controller to impose, throughout the corresponding part of the flight trajectory, the four-dimensional (or 4D) position of the aircraft. This makes it possible to obtain the following advantages:

the air traffic controller can create a string of aircraft without any risk of conflict, by issuing each of them an instruction relating to such a second segment in one and the same zone of the air space, and to do so by simply providing times of passage that are offset by a certain duration at the various auxiliary points.

Furthermore, the lower the second temporal error margin used, the smaller can be the separation between two consecutive aircraft.

Additionally, the workload of the air traffic controller is greatly reduced, since the temporal guidance is carried out by a standard guidance system of the aircraft and not now indirectly by guidance instructions given by the air traffic controller.

It is thus possible to reduce the separation between aircraft, and hence increase the air space density, without however increasing the workload of the air traffic controller;
- it is also possible to implement the present invention on a plurality of aircraft by providing them with second segments which are different, but which join up at one and the same convergence point, thereby making it possible to effectively manage the convergence of these various aircraft to the convergence point; and
- to implement the present invention, it is possible to use a second segment which begins upstream of zones of heavy traffic density, thereby making it possible to avoid the need for late management of risks of conflict in zones of heavy density. Such implementation makes it possible to significantly increase the air traffic controller's deconfliction horizon and also to afford significant advantages to airlines, such as smaller and less frequent delays on arrival, reduction in fuel consumption, etc.

Concerning said preferred embodiment, advantageously:
- in step a), means are provided, making it possible for an operator to manually input at least some of said second input parameters;
- in step a), means are provided, making it possible to automatically receive at least some of said second input parameters; and
- at least said auxiliary points of said second segment are presented on a navigation screen.

Furthermore, whether said second segment contains one or more parts with constant ground speed, it is possible to envisage in respect of each of these parts with constant ground speed a transmission by data transmission link from onboard to the ground of:
- the value of the constant ground speed;
- the position of the start point; and
- the position of the end point (point of transition from one ground speed to another ground speed, or end of said second segment).

The present invention also relates to a device for aiding the guidance of an aircraft, in particular a transport airplane, along a flight trajectory.

According to the invention, said guidance aid device is noteworthy in that it comprises:
- input means for inputting into a flight management system first input parameters comprising:
  - at least one start point corresponding to the start of a first segment on the flight trajectory of the aircraft;
  - at least one end point corresponding to the end of this first segment on said flight trajectory;
  - an arrival time corresponding to the required arrival time of the aircraft at said end point; and
  - a first temporal error margin;
- said flight management system which comprises:
  - means for integrating said first segment into said flight trajectory in such a way as to obtain a first modified trajectory;
  - means for determining a first vertical speed profile, indicating the vertical speed of said aircraft exclusively along said first segment, which allows the aircraft to arrive at said final point at said arrival time;
  - means for deducing a target time for at least one waypoint which is situated on said first segment, from said first vertical speed profile, said target time defining the time at which the aircraft must pass said waypoint; and
  - means for determining a temporal tolerance relating to the compliance with said target time at said waypoint;
- transmission means for providing a guidance system with at least first guidance aid information comprising said first modified trajectory, and, for each waypoint, the target time and the temporal tolerance that are associated with said waypoint; and
- said guidance system which guides the aircraft with the aid of said first guidance aid information, by carrying out a slaving making it possible to cause the aircraft to pass each waypoint at the associated target time, and to do so to within the associated temporal tolerance.

Furthermore, in a preferred embodiment:
- said input means are formed so as to input, moreover, second input parameters comprising:
  - a plurality of successive auxiliary points of said flight trajectory, the first of said successive auxiliary points in the direction of flight of the aircraft corresponding to said end point;
  - associated with at least some of said auxiliary points, times of passage corresponding to the times at which the aircraft must pass respectively these auxiliary points; and
  - a second temporal error margin;
- said flight management system moreover comprises:
  - means for integrating this second segment, following said first segment into said first modified trajectory in such a way as to obtain a second modified trajectory, said first and second segments forming a global segment, said second segment comprising said auxiliary points, beginning at the first of said successive auxiliary points, that is to say at said end point of said first segment, and finishing at the last of said auxiliary points;
  - means for determining, for each auxiliary point with which no time of passage is associated, a target time at which the aircraft must pass said auxiliary point, the target time of the other auxiliary points corresponding to the associated times of passage;
  - means for deducing a second vertical speed profile indicating the vertical speed of said aircraft exclusively along said second segment, which allows the aircraft to pass said auxiliary points at the associated target times; and
  - means for determining an auxiliary temporal tolerance;
- said transmission means are formed so as to provide said guidance system with second guidance aid information, comprising said second modified trajectory, said auxiliary temporal tolerance and, for each auxiliary point, the associated target time; and
- said guidance system is formed so as to guide the aircraft with the aid of said second guidance aid information, by carrying out a slaving making it possible to cause the aircraft to pass each auxiliary point at the associated target time, and to do so within said auxiliary temporal tolerance.

The present invention therefore relates to an aircraft guidance aid, which pertains to four-dimensional navigation, since it makes it possible to calculate the lateral, vertical and longitudinal components (time, speed, etc.) of a reference (flight) trajectory of an aircraft and to guide the aircraft along this reference trajectory while complying with said lateral, vertical and longitudinal components, with predetermined margins.

The figures of the appended drawing will elucidate the manner in which the invention may be embodied. In these figures, identical references designate similar elements.

FIG. 1 is the schematic diagram of a guidance aid device in accordance with the invention.

Figure 2:
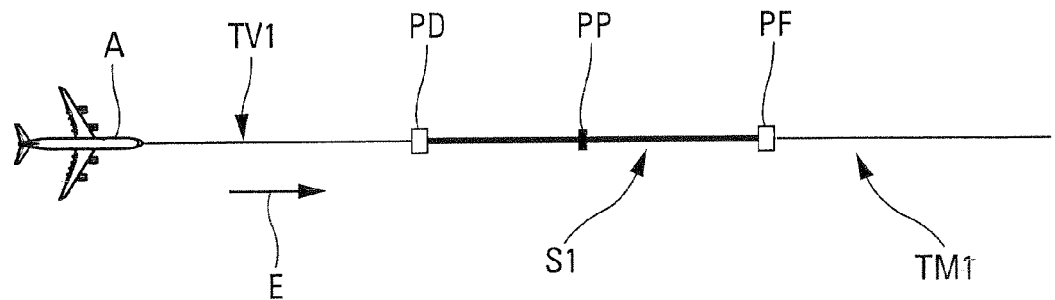
Figure 3:
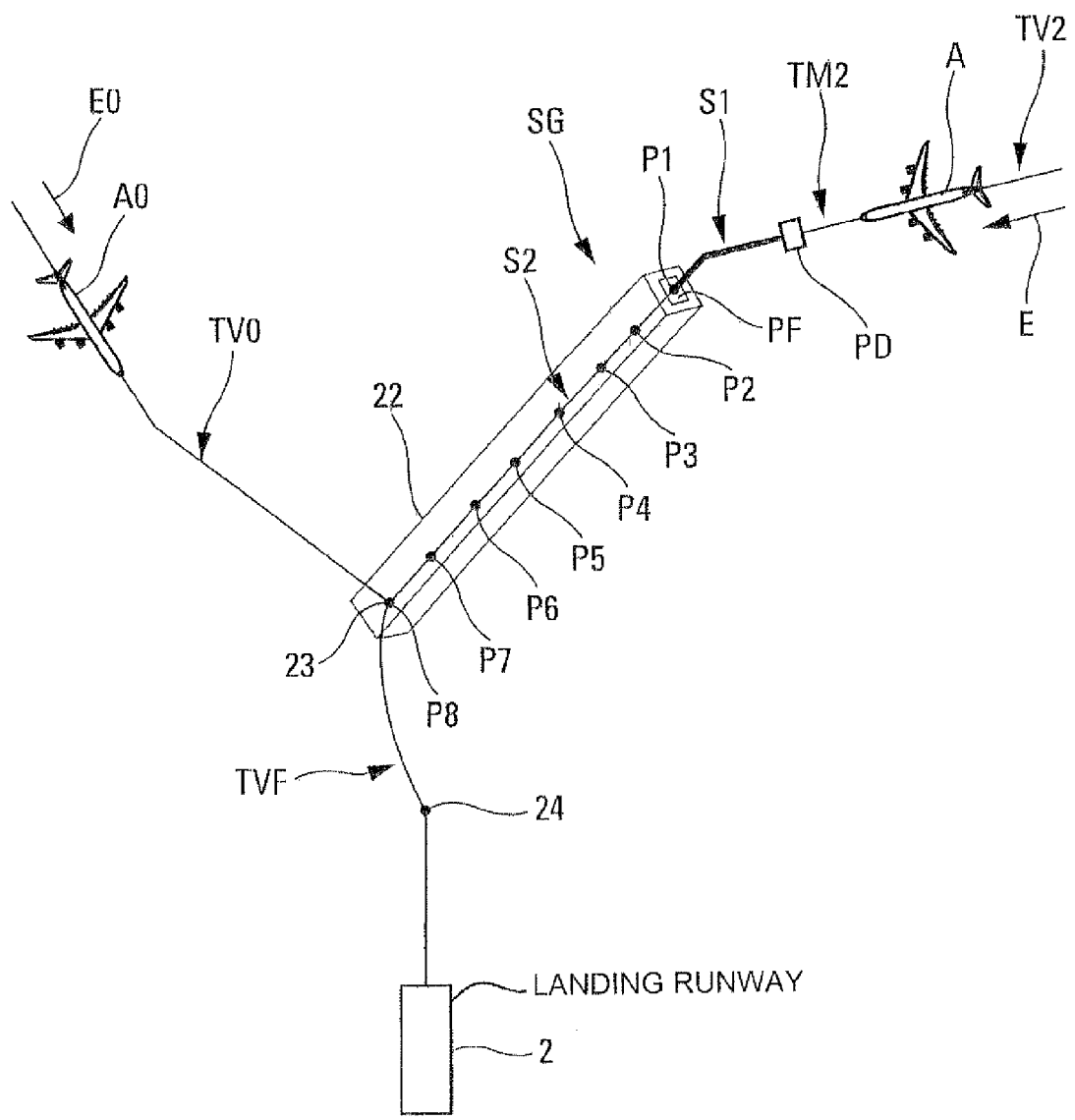

FIGS. 2 and 3 schematically show flight trajectories illustrating characteristics obtained respectively according to two different embodiments of the present invention.

Figure 4:
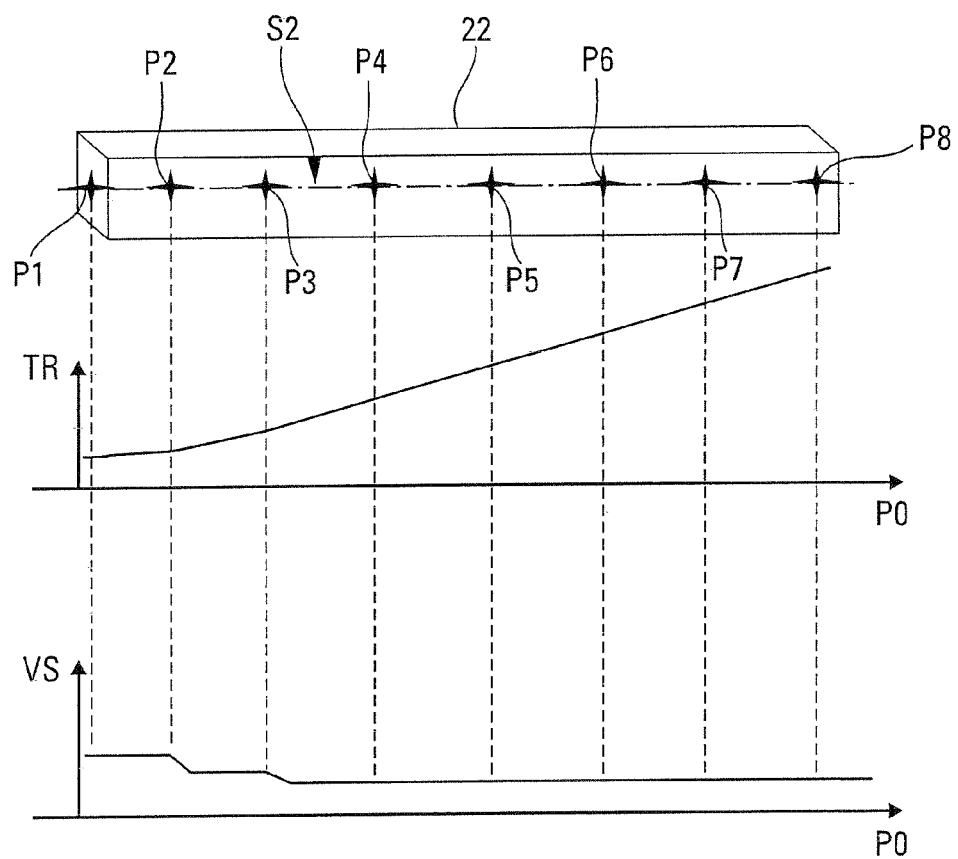

FIG. 4 is a graphic allowing proper explanation of the particular characteristics of the second embodiment illustrated in FIG. 3.

The device 1 in accordance with the invention and represented schematically in FIG. 1 is intended to aid the crew of an aircraft A, in particular of a (civil or military) transport airplane, during the flight of said aircraft A along a flight trajectory TV1, TV2, in particular with a view to landing on a landing runway 2.

According to the invention, said device 1 which is carried onboard the aircraft A comprises:

input means 3 specified hereinbelow, for inputting into a flight management system 4, of FMS type, at least first input parameters comprising:

a start point PD corresponding to the start of a segment S1 on the flight trajectory TV1 of the aircraft, in the direction of flight E of said aircraft, as represented in FIG. 2;

an end point PF which corresponds to the end of this segment S1 on the flight trajectory TV1, in the direction of flight E. The point PD is therefore the point situated upstream and the point PF is the point situated downstream in the direction of flight E along said flight trajectory TV1; and an arrival time corresponding to the required arrival time of the aircraft A at said end point PF; and a first temporal error margin;

said flight management system 4 which comprises the following integrated means, not represented individually in FIG. 1:

means for integrating said segment S1 into said flight trajectory TV1 in such a way as to obtain a modified trajectory TM1. Said flight trajectory TV1 is either determined beforehand in a standard manner by said flight management system 4, or received by the latter;

means for determining a first vertical speed profile indicating the vertical speed of said aircraft A exclusively along said segment S1, which profile enables the aircraft A to arrive at said final point PF at said arrival time;

means for deducing a target time for at least one waypoint (specified hereinbelow) which is situated on said first segment S1, from said first vertical speed profile, said target time defining the time at which the aircraft A must pass said waypoint; and means for determining a temporal tolerance relating to the compliance with said target time at said waypoint;

transmission means, in this instance a standard data transmission link 6 for providing a guidance system 5 with at least first guidance aid information comprising said modified trajectory TM1, and, for each waypoint, the target time and the temporal tolerance that are associated with said waypoint; and said guidance system 5 which guides the aircraft A along the segment S1 of said modified trajectory TM1 with the aid of said first guidance aid information, by carrying out a slaving making it possible to cause said aircraft A to pass each waypoint at the associated target time, and to do so within the associated temporal tolerance.

In a particular embodiment, said guidance system 5 comprises in particular:

a flight computer 7 of FG ("Flight Guidance") type, which formulates guidance orders making it possible to comply at each waypoint with the corresponding target time and to do so within the associated temporal tolerance; and standard means 8 for actuating control members 9 of the aircraft, that are capable of acting on the flight of the aircraft A, for example airfoils (lateral, elevators, roll) of said aircraft A. Said actuating means 8 receive the guidance orders formulated by said flight computer 7 by way of a link 10 and correspondingly actuate said control members 9, as illustrated by a chain dotted link 11 in FIG. 1.

In the first embodiment described previously with reference to FIG. 2, the device 1 makes it possible to comply with a target time at a specific waypoint, in particular at said end point PF. However, in this first embodiment, said device 1 can also ensure compliance with a target time at a plurality of different waypoints, for example at the points PP and PF represented in this FIG. 2.

Within the framework of the present invention, a waypoint of said segment S1 can therefore correspond to various points of this segment S1.

As indicated above, said waypoint can correspond to said end point PF. In this case, the associated target time corresponds to said arrival time, and the associated temporal tolerance corresponds to said temporal error margin. Furthermore, as a variant or adjunct, said waypoint can also correspond to at least one point PP of said segment S1, other than said end point PF. In this case:

the associated target time is an intermediate time at which the aircraft A must pass said waypoint PP in such a way as to arrive at said arrival time at said end point PF; and the associated temporal tolerance is such that it makes it possible to comply with the arrival time at said end point PF to within said temporal error margin.

Furthermore, in a particular variant embodiment, the device 1 implements the aforesaid processing operations for a plurality of successive (but not necessarily adjacent) segments S1 of said flight trajectory TV1.

In a particular embodiment, said input means 3 comprise means 13, for example a keyboard, which are connected by way of a link 14 to said flight management system 4 and which enable an operator, in particular the pilot of the aircraft A, to directly input in a manual manner the input parameters into said flight management system 4.

In another embodiment, as adjunct or variant, said means 3 comprise data reception means 15 which are connected by way of a link 16 to said flight management system 4 and which make it possible to automatically receive from outside the aircraft A, in particular from the ground, input parameters. In this case, the reception of information results from the acceptance by the pilot of an authorization sent by the ground for example by way of a pilot/controller data transmission system, of CPDLC ("Controller Pilot Data Link Communications") type, which is associated with said reception means 15.

Said device 1 can also comprise, in standard fashion, other information sources 17 which are connected by way of a link 18 to said flight management system 4 and which comprise, for example, a navigation database.

Additionally, in a preferred embodiment, the device 1 comprises, moreover, display means 19 which are connected by way of a link 20 to said flight management system 4 and which make it possible to present on a screen 21, for example a navigation screen, information relating to the present invention, and in particular the geographical coordinates of said start point PD and of said end point PF of the segment S1.

It will be noted, moreover, that the arrival time estimated by the flight management system 4 at the end point of the segment S1 can be transmitted from onboard to the ground via a data transmission link.

Consequently, when the aircraft A is flying along the segment S1, the flight computer 7 formulates guidance orders by carrying out a temporal slaving directly on the target time at the next waypoint PP, PF. To do this, said flight computer 7 comprises the following integrated means, not represented individually in FIG. 1:

means making it possible to make a prediction of the time of passage of the aircraft A at each waypoint PP, PF, doing so in a standard manner by taking account in particular of the wind at said waypoint PP, PF and of the distance along the flight trajectory TV1 between the current position of the aircraft A and this waypoint PP, PF;

means for determining the deviation between said predicted time of passage and the target time at said waypoint PP, PF; and means which are such that, when this deviation becomes important and risks exceeding the corresponding temporal tolerance, they instruct an acceleration or deceleration so as to reduce, or even cancel out, this time deviation.

The device 1 in accordance with the invention therefore makes it possible to guarantee with a desired level of precision (first temporal error margin which is adjustable) and a certain probability level, an arrival time of the aircraft A at any point in space, in particular at a standard point of convergence of aircraft during a landing on an airport.

Moreover, according to the invention, the speed fluctuation implemented on the aircraft A in such a way as to enable it to achieve the above objective is limited to said segment S1. This fluctuation is therefore limited in space and in time. This would not for example be the case if the flight management system 4 of the aircraft had simply been provided with a prescribed arrival time of RTA ("Required Time of Arrival") type, since in this case the speed modification would have been implemented as soon as said RTA time was input and up to the arrival at the convergence time, and this might have given rise to potential conflicts between two consecutive aircraft and might have worried the air traffic controller.

In the case of a landing on an airport, the device 1 enables an air traffic controller to ascertain and impose with the level of precision suitable for the controlled zone (by providing a first appropriate temporal error margin), the time of passage of the aircraft A at a predefined point PF of a segment S1, whose limits (start point PD, end point PF) are adjustable. The time is controlled inside said segment S1, and the impact of modified guidance for the temporal slaving is restricted to a zone which may thus be known by the air traffic controller. This adjustable limitation, in space, of the part S1 of the flight trajectory TV1 where the guidance of the aircraft A is temporally slaved, makes it possible in particular to aid the air traffic controller to:

better anticipate the alterations in the traffic (by widening the deconfliction horizon); and sequence the aircraft more precisely, while limiting the risks of conflict between two consecutive aircraft.

Another advantage of the device 1 in accordance with the invention is that an aircraft A can thus be guided on a flight trajectory TV1 integrating time constraints, which are calculated by the flight management system 4 and which are thus optimized (in a standard fashion) in particular as regards fuel consumption, engine wear and environmental impact.

In the second embodiment represented by way of example in FIG. 3, the guidance aid device 1 in accordance with the invention is such as represented in FIG. 1 and described previously, but it moreover exhibits the following characteristics:

said input means 3 are formed so as to input, in addition to the aforesaid first parameters, second input parameters comprising:

a plurality of successive auxiliary points P1 to P8 of the flight trajectory TV2 of the aircraft A, as represented in FIG. 3. For reasons of simplification and ease of understanding in particular of the drawing, FIG. 3 (and the following description) comprise only the auxiliary points P1 to P8. In reality, there exists a number N of auxiliary points PN which is much higher than eight. Said auxiliary points P1 to PN correspond to route points or to points calculated by the flight management system 4 along the flight trajectory TV2 of the aircraft A, and the number N of said auxiliary points P1 to PN is determined by taking account in particular of the distance between said auxiliary points P1 and PN. The first P1 of said successive auxiliary points in the direction of flight E of the aircraft A corresponding to the end point PF of the aforesaid segment S1. Said flight trajectory TV2 is either determined beforehand in a standard fashion by said flight management system 4, or received by the latter;

associated with at least some of said auxiliary points P1 to P8, times of passage corresponding to the times at which the aircraft A must pass respectively these auxiliary points P1 to P8; and a second temporal error margin;

said flight management system 4 comprises, in addition to the aforesaid means, the following integrated means, not represented individually in FIG. 1:

means for incorporating a segment S2 following said segment S1 into said flight trajectory TV2 in such a way as to obtain a modified trajectory TM2. The segments S1 and S2 thus form a global segment SG. Said segment S2 comprises said auxiliary points P1 to P8. It begins at the first P1 of said successive auxiliary points, that is to say at the end point PF of said segment S1, and it finishes at the last P8 of said auxiliary points. Said segment S2 is depicted by a tube 22 in FIGS. 3 and 4;

means for determining, for each auxiliary point with which a time of passage is not associated, a target time at which the aircraft A must pass said auxiliary point, the target time of the other auxiliary points corresponding to the associated times of passage. Thus, for some of said auxiliary points P1 to P8, the time of passage input by the input means 3 is used as associated target time, and for others the associated target time is determined;

means for deducing a second vertical speed profile indicating the vertical speed of said aircraft A exclusively along said segment S2, which profile enables the aircraft A to pass said auxiliary points at the associated target times; and means for determining an auxiliary temporal tolerance;

said transmission means 6 are formed so as to provide said guidance system 5 with second guidance aid information, comprising said modified trajectory TM2, said auxiliary temporal tolerance and, for each auxiliary point P1 to P8, the associated target time; and said guidance system 5 is formed so as to guide the aircraft A along the segment S2 of the modified trajectory TM2, with the aid of said second guidance aid information, by carrying out a slaving making it possible to cause the aircraft A to pass each auxiliary point P1 to P8 at the associated target time, and to do so within said auxiliary temporal tolerance.

In this second embodiment, a global segment SG is therefore obtained which comprises:

upstream, in the direction of flight E, said segment S1 which exhibits the characteristics specified hereinabove with reference to FIG. 2. This segment S1 serves as transition and the purpose thereof is to construct a reference trajectory which complies with the entry time imposed for the segment S2; and said segment S2, in which the times of passage are imposed throughout its length. Several of its points, namely the points P1 to P8 (comprising the initial point P1 and the finishing point P8) in the example of FIG. 3, are constrained by an associated target time.

This second embodiment makes it possible to control, with a certain probability level and the desired level of precision (second temporal error margin which is adjustable), a four-dimensional position or 4D position (3D geographical position of each auxiliary point P1 to P8, associated with a target time relating to this auxiliary point) of the aircraft A in a zone (segment S2) whose limits (P1, P8) in space are fixed. Moreover, by associating said segment S1 with this segment S2 it is possible to impose the limits of the transition zone (segment S1) used to enter said segment S2 at the required time.

In this second embodiment:

the flight computer 7 formulates guidance orders, as indicated previously, by carrying out directly a temporal slaving on the target times at each waypoint P1 to P8, when a deviation between the actual time of passage and the target time becomes important and risks exceeding the auxiliary temporal tolerance. In this case, the flight computer 7 instructs an acceleration or deceleration in such a way as to reduce, or even cancel out, this temporal deviation;

said display means 19 can display on the viewing screen 21, in particular the start and end points PD and PF of the segment S1, as well as the initial and finishing points P1 and P8 of said segment S2.

Furthermore, whether said segment 52 contains one or more parts with constant ground speed, it is possible to envisage in respect of each of these parts with constant ground speed a transmission by data transmission link from onboard to the ground of:

the value of the constant ground speed;
the position of the start point; and
the position of the end point (point of transition from one ground speed to another ground speed, or end of said segment S2).

Of course, the device 1 can provide a plurality of global segments SG along a flight trajectory TV2 of the aircraft A.

Although not exclusively, this second embodiment applies more particularly, as illustrated in FIG. 3, to a phase of landing on a runway 2 of an airport. This landing phase is such that a plurality of aircraft, in this instance the aircraft A equipped with the device 1 in accordance with the invention and at least one other aircraft A0 (along a flight trajectory TV0 in a direction E0), converge towards a point of convergence 23, onwards of which the definitive approach phase is carried out (along a trajectory TVF comprising in particular a point 24 situated in a vertical plane passing through the axis of the runway 2) and the actual landing of said aircraft A and A0. In this particular application, the device 1 makes it possible to preserve a satisfactory separation between the successive aircraft A0 and A and to ensure compliance with a prescribed arrival time sequence at said convergence point 23 with a predefined precision. In this case, the finishing point P8 of the segment S2 is situated at said convergence point 23.

Furthermore, the device 1 in accordance with the invention allows an air traffic controller to impose, throughout the corresponding part (segment S2) of the flight trajectory TV2, the four-dimensional position (or 4D position) of the aircraft A. This makes it possible to obtain the following advantages:

the air traffic controller can create a string of aircraft without risk of conflict, by issuing each of them (equipped with a device 1) with an instruction relating to such a segment S2 in one and the same zone of the air space (the data pertaining to this instruction being input into the device 1 with the aid of the means 13 or means 15), doing so while simply providing times of passage offset by a certain duration at the various auxiliary points P1 to P8.

Furthermore, the lower the second temporal error margin used, the smaller can be the separation between two consecutive aircraft.

Additionally, the air traffic controller's workload is greatly reduced, since the temporal guidance is carried out by a standard guidance system 5 of the aircraft A and not now indirectly by guidance instructions given by the air traffic controller.

The device 1 thus makes it possible to reduce the separation between aircraft, and hence to increase the density of the air space, without however increasing the workload of the air traffic controller;

the present invention can be implemented on a plurality of aircraft by providing them segments S2 which are different, but which join up at one and the same convergence point 23, thereby making it possible to effectively manage the convergence of these various aircraft at said convergence point 23; and the device 1 can take into account a segment S2 which starts upstream of zones of heavy traffic density, thereby making it possible to avoid the need for late management of risks of conflict in the zones of heavy density. Such an implementation makes it possible to significantly increase the air traffic controller's deconfliction horizon and also to afford significant advantages to airlines, such as smaller and less frequent delays on arrival, reduction in fuel consumption, etc.

The device 1 in accordance with the invention and represented in FIG. 1 is able to implement both said first embodiment of FIG. 2 and said second embodiment of FIG. 3. Simply depending on the embodiment chosen, the operations and processing carried out by the various means, and in particular by the input means 3, the flight management system 4 and the flight computer 7 are different and suited to the embodiment considered.

In a particular embodiment, the aforesaid means of said flight computer 7 which are intended to determine, for each auxiliary point with which no time of passage is associated, a target time at which the aircraft A must pass said auxiliary point, presuppose that between two auxiliary points, the ground speed is constant. More precisely, between two auxiliary points (separated by a distance D) with which a required time of passage is in each instance associated, this time TR1 and TR2, the ground speed VS is assumed to exhibit a constant value which is deduced from the following expression:

$$VS=(TR2-TR1)/D$$

However, locally, around the points exhibiting required times of passage, the ground speed VS can vary so as to allow a transition from one ground speed to another. In FIG. 4, a situation has been represented where a ground speed transition is necessary. In this FIG. 4 are represented, in particular, associated with a segment S2:
- the position P0 of the aircraft A, as abscissa;
- the time required TR, on a first ordinate scale; and
- the corresponding ground speed VS, on a second ordinate scale.

The device 1 in accordance with the present invention therefore relates to an aid for guiding an aircraft A, which pertains to four-dimensional navigation, since it makes it possible to calculate the lateral, vertical and longitudinal components (time, speed, etc.) of a reference trajectory TV1, TV2 of the aircraft A, and to guide the aircraft A along this reference trajectory TV1, TV2 while complying with said lateral, vertical and longitudinal components, with predetermined margins.

The invention claimed is:

1. A method for providing guidance information of an aircraft (A) along a flight trajectory (TV1, TV2), wherein:
a) generating first input parameters, comprising:
at least one start point (PD) corresponding to the start of a first segment (S1) on said flight trajectory (TV1);
at least one end point (PF) corresponding to the end of this first segment (S1) on said flight trajectory (TV1);
an arrival time corresponding to the required arrival time of the aircraft (A) at said end point (PF); and
a first temporal error margin;
b) on the basis of said start point (PD), of said end point (PF), of said arrival time and of said first temporal error margin, automatically:
determining at least said first segment (S1) which starts at said start point (PD) and finishes at said end point (PF);
integrating this first segment (S1) into said flight trajectory (TV1) in such a way as to obtain a first modified trajectory (TM1);
determining a first vertical speed profile, indicating the vertical speed of said aircraft (A) exclusively along said first segment (S1), which allows the aircraft (A) to arrive at said final point (PF) at said arrival time;
deducing a target time for at least one waypoint (PP, PF) which is situated on said first segment (S1), from said first vertical speed profile, said target time defining the time at which the aircraft (A) must pass said waypoint (PP, PF);
determining a temporal tolerance relating to the compliance with said target time at said waypoint (PP, PF) at least on the basis of said first temporal error margin; and
providing at least first guidance aid information comprising said first modified trajectory (TM1), and, for each waypoint (PP, PF), the target time and the temporal tolerance that are associated with said waypoint.

2. The method as claimed in claim 1, wherein said step b) is implemented for a plurality of different waypoints (PP, PF).

3. The method as claimed in claim 1,
wherein in a subsequent step c), the aircraft (A) is guided with the aid of said first guidance aid information, by carrying out a slaving making it possible to cause the aircraft (A) to pass each waypoint (PP, PF) at the associated target time, and within the associated temporal tolerance.

4. The method as claimed in claim 1,
wherein in step a), an operator manually inputs at least some of said first input parameters by employing an input unit.

5. The method as claimed in claim 1,
wherein in step a), at least some of said first input parameters are automatically received by a data reception unit.

6. The method as claimed in claim 1,
wherein said waypoint corresponds to said end point (PF), said associated target time corresponds to said arrival time, and said associated temporal tolerance corresponds to said temporal error margin.

7. The method as claimed in claim 1, wherein:
said waypoint corresponds to a point (PP) of said first segment (S1), other than said end point (PF);
said associated target time is an intermediate time at which the aircraft (A) must pass said waypoint (PP) in such a way as to arrive at said arrival time at said end point (PF); and
said associated temporal tolerance is such that it makes it possible to comply with the arrival time at said end point (PF) to within said temporal error margin.

8. The method as claimed in claim 1,
wherein at least steps a) and b) are carried out for a plurality of first segments (S1).

9. The method as claimed in claim 1,
wherein at least said start and end points (PD, PF) are presented on a navigation screen.

10. The method as claimed in claim 1, wherein:
in step a), second input parameters are moreover generated, comprising:
a plurality of successive auxiliary points (P1 to P8) of said flight trajectory (TV2), the first (P1) of said successive auxiliary points in the direction of flight (E) of the aircraft (A) corresponding to said end point (PF);
associated with at least some of said auxiliary points (P1 to P8) times of passage corresponding to the times at which the aircraft (A) must pass respectively these auxiliary points (P1 to P8); and
a second temporal error margin; and
step b) includes, on the basis of said auxiliary points (P1 to P8), of said times of passage and of said second temporal error margin, automatically:
determining at least one second segment (S2), which comprises said auxiliary points (P1 to P8), which begins at the first (P1) of said successive auxiliary points, that is to say at said end point (PF) of said first segment (S1), and which finishes at the last (P8) of said auxiliary points;
integrating this second segment (S2) following said first segment (S1) into said first modified trajectory in such a way as to obtain a second modified trajectory (TM2), said first and second segments forming a global segment (SG);
determining a target time at which the aircraft (A) must pass said auxiliary point for each auxiliary point with which no time of passage is associated, the target time of the other auxiliary points corresponding to the associated times of passage;
deducing a second vertical speed profile, indicating the vertical speed of said aircraft (A) exclusively along said second segment (S2), which allows the aircraft (A) to pass said auxiliary points (P1 to P8) at the associated target times;
determining an auxiliary temporal tolerance at least on the basis of said second temporal error margin; and
providing second guidance aid information comprising said second modified trajectory (TM2), said auxiliary temporal tolerance and, for each auxiliary point (P1 to P8), the associated target time.

11. The method as claimed in claim 10,
wherein in step c), the aircraft (A) is guided with the aid of said second guidance aid information, by carrying out a slaving making it possible to cause the aircraft (A) to pass each auxiliary point (P1 to P8) at the associated target time, and to do so to within said auxiliary temporal tolerance.

12. The method as claimed in claim 10, wherein in step a), an operator manually inputs at least some of said second input parameters by employing an input unit.

13. The method as claimed in claim 10, wherein in step a), at least some of said second input parameters are automatically received by a data reception unit.

14. The method as claimed in claim 10, wherein at least said auxiliary points (P1 to P8) of said second segment (S2) are presented on a navigation screen.

15. A device for aiding the guidance of an aircraft along a flight trajectory, which device comprises:
an input unit for inputting into a flight management system first input parameters comprising:
at least one start point (PD) corresponding to the start of a first segment (S1) on the flight trajectory (TV1) of the aircraft (A);
at least one end point (PF) corresponding to the end of this first segment (S1) on said flight trajectory (TV1);
an arrival time corresponding to the required arrival time of the aircraft (A) at said end point (PF); and
a first temporal error margin;
said flight management system comprising:
an integration unit for integrating said first segment (S1) into said flight trajectory (TV1) in such a way as to obtain a first modified trajectory (TM1);
a determination unit for determining a first vertical speed profile, indicating the vertical speed of said aircraft (A) exclusively along said first segment (S1), which allows the aircraft (A) to arrive at said final point (PF) at said arrival time;
a deducing unit for deducing a target time for at least one waypoint (PP, PF) which is situated on said first segment (S1), from said first vertical speed profile, said target time defining the time at which the aircraft (A) must pass said waypoint (PP, PF); and
a determination unit for determining a temporal tolerance relating to the compliance with said target time at said waypoint (PP, PF);
a guidance system; and
a transmission unit for providing said guidance system with at least first guidance aid information comprising said first modified trajectory (TM1), and, for each waypoint (PP, PF), the target time and the temporal tolerance that are associated with said waypoint (PP, PF), wherein:
said guidance system guides the aircraft (A) with the aid of said first guidance aid information, by carrying out a slaving making it possible to cause the aircraft (A) to pass each waypoint (PP, PF) at the associated target time, and within the associated temporal tolerance.

16. The device as claimed in claim 15, wherein:
said input unit is formed so as to input, moreover, second input parameters comprising:
a plurality of successive auxiliary points (P1 to P8) of said flight trajectory (TV2), the first (P1) of said successive auxiliary points in the direction of flight (E) of the aircraft (A) corresponding to said end point (PF);
associated with at least some of said auxiliary points (P1 to P8), times of passage corresponding to the times at which the aircraft (A) must pass respectively these auxiliary points (P1 to P8); and
a second temporal error margin;
said flight management system moreover comprises:
an integration unit for integrating this second segment (S2), following said first segment (S1) into said first modified trajectory (TM1) in such a way as to obtain a second modified trajectory (TM2), said first and second segments forming a global segment (SG), said second segment (S2) comprising said auxiliary points (P1 to P8), beginning at the first (P1) of said successive auxiliary points, that is to say at said end point (PF) of said first segment (S1), and finishing at the last (P8) of said auxiliary points;
a determination unit for determining, for each auxiliary point with which no time of passage is associated, a target time at which the aircraft (A) must pass said auxiliary point, the target time of the other auxiliary points corresponding to the associated times of passage;
a deduction unit for deducing a second vertical speed profile indicating the vertical speed of said aircraft (A) exclusively along said second segment (S2), which allows the aircraft (A) to pass said auxiliary points (P1 to P8) at the associated target times; and
a determination unit for determining an auxiliary temporal tolerance, wherein:
said transmission unit is formed so as to provide said guidance system (5) with second guidance aid information, comprising said second modified trajectory (TM2), said auxiliary temporal tolerance and, for each auxiliary point (P1 to P8), the associated target time; and
said guidance system is formed so as to guide the aircraft (A) with the aid of said second guidance aid information, by carrying out a slaving making it possible to cause the aircraft (A) to pass each auxiliary point (P1 to P8) at the associated target time, and to do so within said auxiliary temporal tolerance.

17. An aircraft, wherein it comprises a device such as that specified under claim 15.

18. A method for providing guidance information of an aircraft (A) along a flight trajectory (TV1, TV2), the method comprising:
a) generating first input parameters comprising:
at least one start point (PD) corresponding to the start of a first segment (S1) on said flight trajectory (TV1);
at least one end point (PF) corresponding to the end of this first segment (S1) on said flight trajectory (TV1);
an arrival time corresponding to the required arrival time of the aircraft (A) at said end point (PF); and
a first temporal error margin;
b) on the basis of said start point (PD), of said end point (PF), of said arrival time and of said first temporal error margin, automatically:
determining at least said first segment (S1) which starts at said start point (PD) and finishes at said end point (PF);
integrating this first segment (S1) into said flight trajectory (TV1) in such a way as to obtain a first modified trajectory (TM1);
determining a first vertical speed profile, indicating the vertical speed of said aircraft (A) exclusively along said first segment (S1), which allows the aircraft (A) to arrive at said final point (PF) at said arrival time;
deducing a target time for at least one waypoint (PP, PF) which is situated on said first segment (S1), from said first vertical speed profile, said target time defining the time at which the aircraft (A) must pass said waypoint (PP, PF);

determining a temporal tolerance relating to the compliance with said target time at said waypoint (PP, PF) at least on the basis of said first temporal error margin; and providing at least first guidance aid information comprising said first modified trajectory (TM1), and, for each waypoint (PP, PF), the target time and the temporal tolerance that are associated with said waypoint, wherein:

in step a), second input parameters are moreover generated, comprising:

a plurality of successive auxiliary points (P1 to P8) of said flight trajectory (TV2), the first (P1) of said successive auxiliary points in the direction of flight (E) of the aircraft (A) corresponding to said end point (PF);

associated with at least some of said auxiliary points (P1 to P8), times of passage corresponding to the times at which the aircraft (A) must pass respectively these auxiliary points (P1 to P8); and a second temporal error margin; and in step b), on the basis of said auxiliary points (P1 to P8), of said times of passage and of said second temporal error margin, automatically:

determining at least one second segment (S2), which comprises said auxiliary points (P1 to P8), which begins at the first (P1) of said successive auxiliary points, that is to say at said end point (PF) of said first segment (S1), and which finishes at the last (P8) of said auxiliary points;

integrating this second segment (S2) following said first segment (S1) into said first modified trajectory in such a way as to obtain a second modified trajectory (TM2), said first and second segments forming a global segment (SG);

determining a target time at which the aircraft (A) must pass said auxiliary point for each auxiliary point with which no time of passage is associated, the target time of the other auxiliary points corresponding to the associated times of passage;

deducing a second vertical speed profile, indicating the vertical speed of said aircraft (A) exclusively along said second segment (S2), which allows the aircraft (A) to pass said auxiliary points (P1 to P8) at the associated target times;

determining an auxiliary temporal tolerance at least on the basis of said second temporal error margin; and providing second guidance aid information comprising said second modified trajectory (TM2), said auxiliary temporal tolerance and, for each auxiliary point (P1 to P8), the associated target time.

* * * * *